United States Patent
Terada et al.

(10) Patent No.: US 9,751,478 B2
(45) Date of Patent: Sep. 5, 2017

(54) BUMPER REINFORCEMENT

(71) Applicants: NIKKEIKIN ALUMINIUM CORE TECHNOLOGY COMPANY LTD., Shinagawa-ku, Tokyo (JP); NIPPON LIGHT METAL COMPANY, LTD., Shinagawa-ku, Tokyo (JP)

(72) Inventors: Taichi Terada, Shizuoka (JP); Shigenori Saito, Tokyo (JP); Shoji Mochizuki, Shizuoka (JP)

(73) Assignees: Nikkeiken Aluminum Core Technology Company, Ltd., Tokyo (JP); Nippon Light Metal Company, Ltd., Tokyo (JP)

( * ) Notice: Subject to any disclaimer, the term of this patent is extended or adjusted under 35 U.S.C. 154(b) by 0 days.

(21) Appl. No.: 14/896,303

(22) PCT Filed: May 14, 2014

(86) PCT No.: PCT/JP2014/062777
§ 371 (c)(1),
(2) Date: Dec. 4, 2015

(87) PCT Pub. No.: WO2014/196321
PCT Pub. Date: Dec. 11, 2014

(65) Prior Publication Data
US 2016/0121826 A1    May 5, 2016

(30) Foreign Application Priority Data

Jun. 7, 2013   (JP) ................................ 2013-120353

(51) Int. Cl.
*B60R 19/18*    (2006.01)
(52) U.S. Cl.
CPC ........ *B60R 19/18* (2013.01); *B60R 2019/182* (2013.01); *B60R 2019/1866* (2013.01)

(58) Field of Classification Search
CPC ............ B60R 19/18; B60R 2019/1866; B60R 2019/182
(Continued)

(56) References Cited

U.S. PATENT DOCUMENTS

| 5,727,826 A | 3/1998 | Frank et al. |
| 6,318,775 B1 | 11/2001 | Heatherington et al. |

(Continued)

FOREIGN PATENT DOCUMENTS

| JP | 6-142754 A | 5/1994 |
| JP | 2001-88633 A | 4/2001 |

(Continued)

OTHER PUBLICATIONS

International Search Report (PCT/ISA/210) issue in counterpart International Application No. PCT/JP2014/062777 dated Aug. 19, 2014, with English translation (Three (3) pages).

(Continued)

*Primary Examiner* — Joseph D Pape
*Assistant Examiner* — Dana Ivey
(74) *Attorney, Agent, or Firm* — Crowell & Moring LLP (57) ABSTRACT

A bumper reinforcement composed of a hollow shape material includes: a rear wall; an upper wall; a lower wall; a front wall; a partition wall located between the rear wall and the front wall and extending from the upper wall to the lower wall; an upper support wall and a lower support wall located between the upper wall and the lower wall and extending from the rear wall to the partition wall; and an intermediate support wall located between the upper wall and the lower wall and extending from the front wall to the partition wall. An intersection of the partition wall with the upper support wall is located above an intersection of the partition wall with the intermediate support wall, and an intersection of the partition wall with the lower support wall is located below (Continued)

the intersection of the partition wall with the intermediate support wall.

6 Claims, 7 Drawing Sheets

(58) Field of Classification Search
USPC .......................................................... 293/120
See application file for complete search history.

(56) References Cited

U.S. PATENT DOCUMENTS

| 7,537,252 B2 * | 5/2009 | Nagai | B60R 19/18 |
| | | | 293/102 |
| 2009/0152881 A1 | 6/2009 | Shin | |

FOREIGN PATENT DOCUMENTS

| WO | WO 2007/110938 A1 | 10/2007 |
| WO | WO 2009/110461 A1 | 9/2009 |

OTHER PUBLICATIONS

Japanese language Written Opinion (PCT/ISA/237) issue in counterpart International Application No. PCT/JP2014/062777 dated Aug. 19, 2014 (Three (3) pages).

Japanese-language Office Action issued in counterpart Japanese Application No. 2013-120353 dated Sep. 27, 2016 (Three (3) pages).

* cited by examiner

BUMPER REINFORCEMENT

TECHNICAL FIELD

The present invention relates to a bumper reinforcement.

BACKGROUND ART

Patent Literatures 1, 2 disclose a bumper structure for an automobile which includes a hollow bumper reinforcement and a pair of right-and-left bumper stays supporting the bumper reinforcement. The bumper structure absorbs collision energy in a process of allowing bending deformation to arise in the bumper reinforcement (hereinafter referred to as a "beam bending process"), absorbs collision energy in a process of allowing the bumper stays to sink into the bumper reinforcement (hereinafter referred to as a "beam crushing process"), and further absorbs collision energy in a process of allowing crushing to arise in the bumper stays (hereinafter referred to as a "stay crushing process"). The bumper structure makes it possible to provide a greater amount of absorption of collision energy while reducing a peak of collision reaction force, and accordingly, makes it possible to reduce damage which would be exerted on the vehicle body while preventing malfunction of a safety device (e.g., an air-bag or the like) at a time of minor collision. Note that in the beam bending process for a bumper reinforcement having a bent portion or a curved portion, collision energy is absorbed even in a process of allowing the bent portion or the curved portion to be extended in a linear fashion.

The bumper reinforcement disclosed in Patent Literatures 1, 2 includes an outer shell of a rectangular tubular shape, and a support wall which partitions an internal space of the outer shell into upper and lower spaces. The support wall is provided parallel to an upper wall and a lower wall of the outer shell and connects a rear wall with a front wall of the outer shell. Providing the support wall improves section rigidity of the bumper reinforcement, thereby making it possible to achieve a reduction in thickness and weight without a reduction in the amount of absorption of collision energy.

CITATION LIST

Patent Literature

Patent Literature 1: WO 2007/110938, pamphlet
Patent Literature 2: WO 2009/110461, pamphlet

SUMMARY OF THE INVENTION

Technical Problem

A conventional bumper structure is designed with a case where a collision load acts on the entire height of a bumper reinforcement. Accordingly, when a position of height of a collision partner is deviated from the partition wall to be offset to an upper or lower side, an upper half part or a lower half part of the bumper reinforcement crushes at an early stage of the collision in some cases. When the upper half part or the lower half part of the bumper reinforcement completely crushes, the collision load cannot be received at the bumper reinforcement thereafter. Consequently, there is a risk that a phenomenon in which the bumper reinforcement gets up on the collision partner or a phenomenon in which the bumper reinforcement gets into under the collision partner occurs. Note that in the description below, collision in a state where a position on which a collision load acts is offset to an upper or lower side is referred to as an "offset collision" in some cases.

In view of these problems, the present invention makes it an object thereof to provide a bumper reinforcement having a shape capable of withstanding an offset collision.

Solution to Problem

In order to solve the above problems, the present invention provides a bumper reinforcement composed of a hollow shape material, including: a rear wall which faces a vehicle body; an upper wall which extends forward from an upper part of the rear wall; a lower wall which extends forward from a lower part of the rear wall; a front wall which extends forward from the upper wall to the lower wall; a partition wall which is located between the rear wall and the front wall and which extends from the upper wall to the lower wall; an upper support wall and a lower support wall which are located between the upper wall and the lower wall and which extend from the rear wall to the partition wall; and an intermediate support wall which is located between the upper wall and the lower wall and which extends from the front wall to the partition wall, wherein an intersection of the partition wall with the upper support wall is located above an intersection of the partition wall with the intermediate support wall, and an intersection of the partition wall with the lower support wall is located below the intersection of the partition wall with the intermediate support wall.

In the present invention, a direction in which the bumper reinforcement gets away from the vehicle body is defined as "front". Therefore, where the bumper reinforcement according to the present invention is applied to a front bumper, a direction of forward movement of the vehicle is defined as "front", and where the bumper reinforcement is applied to a rear bumper, a direction of backward movement of the vehicle is defined as "rear".

The bumper reinforcement according to the present invention includes a space surrounded by the upper wall, the front wall, the partition wall and the intermediate support wall (hereinafter referred to as an "upper crushing space"), and a space surrounded by the lower wall, the front wall, the partition wall and the intermediate support wall (hereinafter referred to as a "lower crushing space"). More specifically, in the bumper reinforcement according to the present invention, two crushing spaces (the upper crushing space and the lower crushing space) in the up-down direction are formed on the front side of the partition wall. Where a position on which a collision load acts is offset to the upper side of the intermediate support wall, buckling and plastic deformation are generated in the upper wall and an upper part of the front wall at an early stage of the collision, to cause the upper crushing space to principally crush to allow collision energy to be absorbed. Where the position on which a collision load acts is offset to the lower side of the intermediate support wall, buckling and plastic deformation are generated in the lower wall and a lower part of the front wall at the early stage of the collision, to cause the lower crushing space to principally crush to allow collision energy to be absorbed.

Moreover, in the bumper reinforcement according to the present invention, an upper half of the partition wall (i.e., a portion of the partition wall located on the upper side of the intermediate support wall) is supported by the upper support wall, and a lower half of the partition wall (i.e., a portion of the partition wall located on the lower side of the intermediate support wall) is supported by the lower support wall. Consequently, a space surrounded by the rear wall, the upper wall, the lower wall and the partition wall (hereinafter referred to as a "support space") is hard to get crushed as compared to the crushing spaces. That is, the bumper reinforcement according to the present invention makes it possible, even after the upper crushing space or the lower crushing space crushes due to the up-down offset collision, to receive a collision load at a rear half part of the bumper reinforcement (a portion located on the vehicle body side relative to the partition wall), and accordingly to reduce occurrence of a phenomenon in which the bumper reinforcement gets into under a collision partner or a phenomenon in which the bumper reinforcement gets up on the collision partner.

A cross-sectional shape of the partition wall is preferably an arc shape formed convexly toward the front wall. This allows the partition wall to be an arc and the intermediate support wall to be supported at the top of the arch, thereby reducing deformation generated in the partition wall as compared to a case where the partition wall has the form of a flat plate.

The upper support wall and the lower support wall can be allowed to face each other across a virtual plane which passes through the intermediate support wall, and a distance between the upper support wall and the virtual plane can be equal to a distance between the lower support wall and the virtual plane. This allows positional relationship of the upper support wall, the lower support wall and the intermediate support wall to be balanced, thereby making it possible, even where a position on which a collision load acts is offset to any of an upper or lower direction, to make the amount of absorption of collision energy on the upper and lower sides to an equal degree.

Advantageous Effects of the Invention

The present invention makes it possible to withstand an offset collision. More specifically, the bumper reinforcement according to the present invention makes it possible to reduce occurrence of a phenomenon in which the bumper reinforcement gets into under a collision partner or a phenomenon in which the bumper reinforcement gets up on the collision partner.

BRIEF DESCRIPTION OF DRAWINGS

FIGS. 4A to 4F are schematic views showing a deformation mode at a time of collision with a flat barrier, in which

FIGS. 6A to 6F are schematic views showing a deformation mode at a time of up-down offset collision, in which

DESCRIPTION OF EMBODIMENTS

Figure 1:
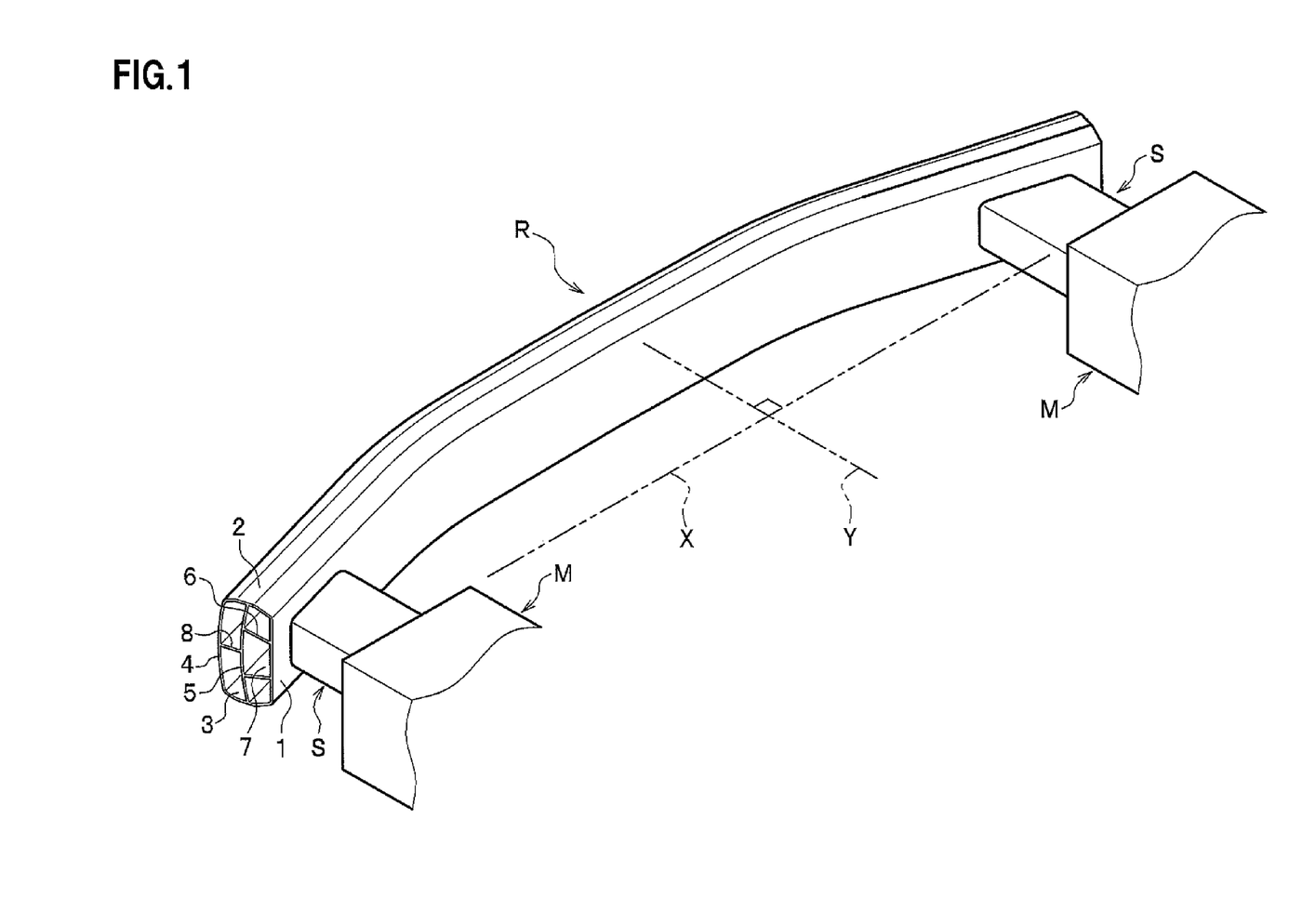
FIG. 1 is a perspective view of a bumper structure including a bumper reinforcement according to an embodiment of the present invention.

As shown in FIG. 1, a bumper reinforcement R according to an embodiment of the present invention is a plate for composing a front bumper of an automobile, and is supported by a pair of right-and-left bumper stays S, S. The bumper stays S, S are fixed to front end portions of side members (vehicle body) M, M.

In the present embodiment, "right-left", "front-back" and "up-down" are defined with a state as the base, in which the bumper reinforcement R is mounted on the bumper stays S, S. That is, the "right-left direction" is used synonymously with a "width direction of the vehicle", and coincides with a direction along a virtual horizontal axis X which connects front ends of the side members M, M with each other. The "front-back direction" is used synonymously with a "straight-movement direction of the vehicle", and coincides with a direction along a virtual vertical axis Y perpendicular to the horizontal axis X.

Figure 2:
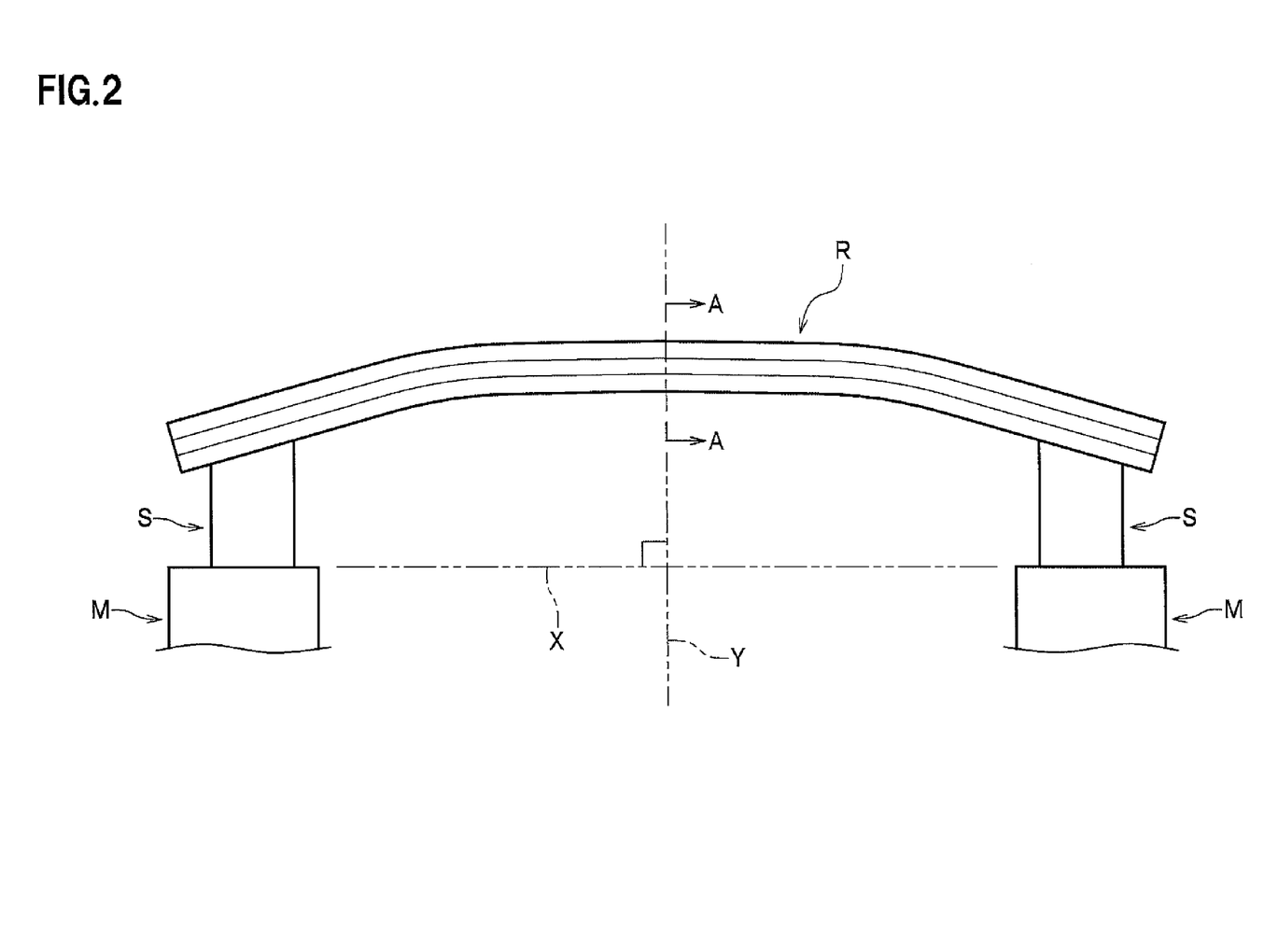
FIG. 2 is a plan view of the bumper structure shown in FIG. 1.

As also shown in FIG. 2, the bumper reinforcement R has a planar shape formed convexly toward the front side. Both end portions of the bumper reinforcement R are inclined toward the rear of the vehicle. Note that, although the present embodiment illustrates by an example the case where the planar shape (line shape) of the bumper reinforcement R is an arc shape, the bumper reinforcement R may be formed in a linear fashion.

The bumper reinforcement R is composed of a hollow extruded shape material made of aluminum alloy. Curved portions of the bumper reinforcement R can be formed, for example, by pressing a bending template against a rear surface of a linear hollow extruded shape material which is an elementary material of the bumper reinforcement R, with both end portions of the hollow extruded shape material being clamped.

As shown in FIG. 1, the bumper reinforcement R includes a rear wall 1 which faces the side member M (vehicle body), an upper wall 2 which extends forward from an upper part of the rear wall 1, a lower wall 3 which extends forward from a lower part of the rear wall 2, a front wall 4 which extends forward from the upper wall 2 to the lower wall 3, a partition wall 5 which is located between the rear wall 1 and the front wall 4 and which extends from the upper wall 2 to the lower wall 3, an upper support wall 6 and a lower support wall 7 which are located between the upper wall 2 and the lower wall 3 and which extend from the rear wall 1 to the partition wall 5, and an intermediate support wall 8 which is located between the upper wall 2 and the lower wall 3 and which extends from the front wall 4 to the partition wall 5.

More specifically, the bumper reinforcement R includes an outer shell of a closed cross-sectional shape (the rear wall 1, the upper wall 2, the lower wall 3 and the front wall 4), the partition wall 5 which divides an internal space of the outer shell into front and rear spaces, the upper support wall 6 and the lower support wall 7 which are inserted between the rear wall 1 and the partition wall 5, and the intermediate support wall 8 which is inserted between the front wall 4 and the partition wall 5. The outer shell, the partition wall 5 and each support wall 6, 7, 8 are continuously formed over the entire length of the bumper reinforcement R. Moreover, respective thicknesses of the outer shell, the partition wall 5, and each of the support walls 6, 7, 8 are the same as each other.

Figure 3:
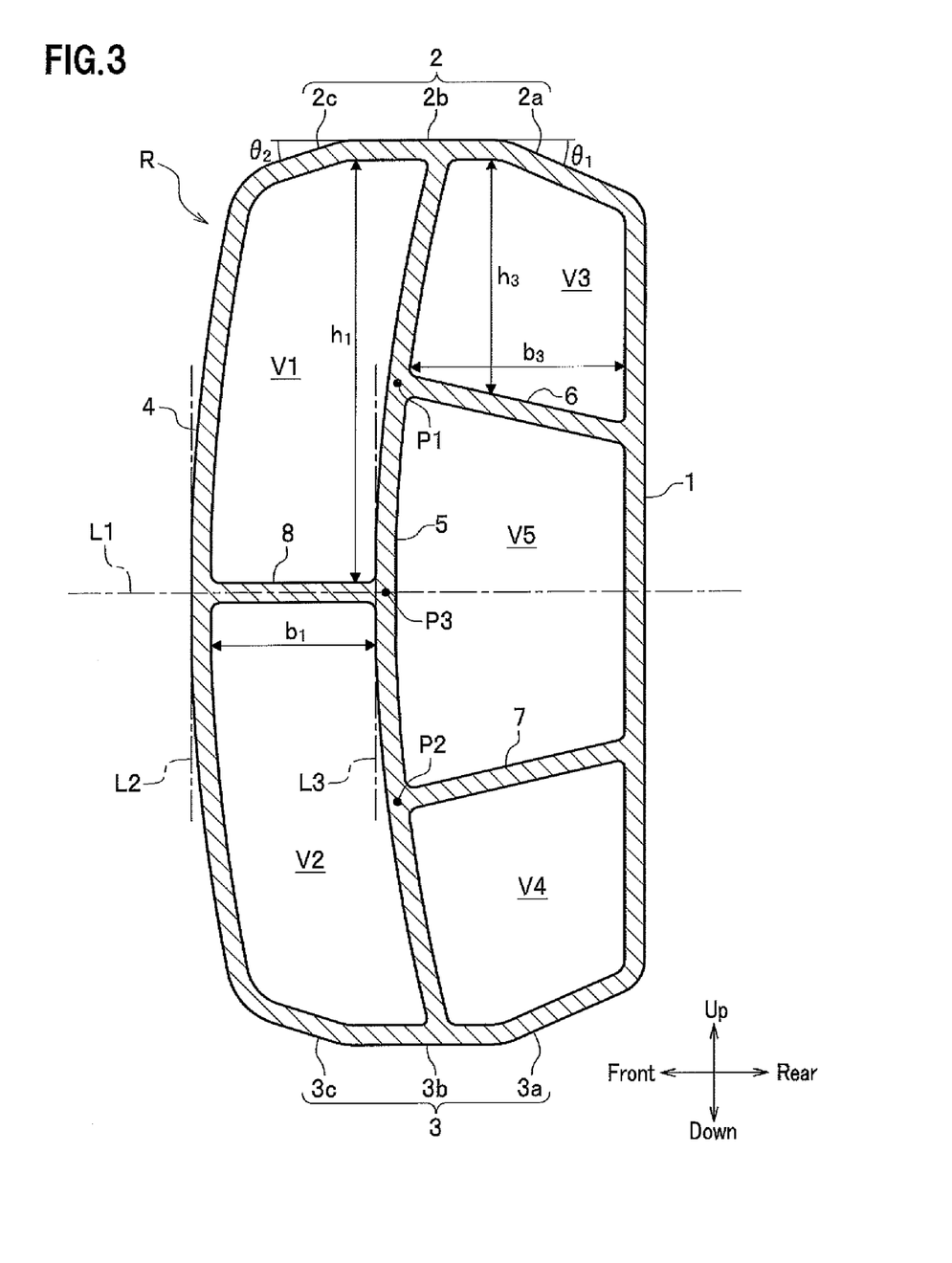
FIG. 3 is an end view taken along the A-A line in FIG. 2.

Configuration of the bumper reinforcement R will be described in detail with reference to FIG. 3. FIG. 3 is an end view taken along the A-A line in FIG. 2 (a view appearing when cutting along a virtual plane which includes a central axis of the hollow extruded shape material as a normal line). In FIG. 3, a dot-and-dash line L1 indicates a virtual plane (hereinafter referred to as a "virtual plane L1") which passes through the intermediate support wall 8. A dot-and-dash line L2 indicates a virtual vertical line (hereinafter referred to as a "tangent line L2") which adjoins a front face of the front wall 4 at the intersection of the virtual plane L1 with the front face of the front wall 4. A dot-and-dash line L3 indicates a virtual vertical line (hereinafter referred to as a "tangent line L3") which adjoins a front face of the partition wall 5 at the intersection of the virtual plane L1 with the front face of the partition wall 5.

The rear wall 1 has a cross-sectional shape with no bend or curve (a linear shape parallel to the vertical line). Front ends of the bumper stays S, S (see FIG. 1) are fixed to a rear face of the rear wall 1. Although illustration is omitted, an upper end portion of the rear wall 1 may be extended above an intersection of the rear wall 1 with the upper wall 2, and a lower end portion of the rear wall 1 may be extended below an intersection of the rear wall 1 with the lower wall 3. That is, the upper end portion of the rear wall 1 may be utilized as a flange which spreads above from the upper wall 2, and the lower end portion of the rear wall 1 may be utilized as a flange which spreads below from the lower wall 3.

The upper wall 2 includes an upper wall rear part 2a which extends upward and forward at an angle from an upper edge of the rear wall 1, an upper wall intermediate part 2b which extends along the horizontal plane from a front edge of the upper wall rear part 2a, and an upper wall front part 2c which extends from a front edge of the upper wall intermediate part 2b to the front wall 4.

The upper wall rear part 2a, the upper wall intermediate part 2b and the upper wall front part 2c have the shape of a flat plate, respectively. An inclination angle $\theta_1$ of the upper wall rear part 2a relative to the horizontal plane is equal to or less than 45 degrees and an inclination angle $\theta_2$ of the upper wall front part 2c relative to the horizontal plane is equal to or less than 45 degrees.

The lower wall 3 includes a lower wall rear part 3a which extends downward and forward at an angle from a lower edge of the rear wall 1, a lower wall intermediate part 3b which extends along the horizontal plane from a front edge of the lower wall rear part 3a, and a lower wall front part 3c which extends from a front edge of the lower wall intermediate part 3b to the front wall 4. A cross-sectional shape of the lower wall 3 is the same as a cross-sectional shape of the upper wall 2 which is inverted up and down.

The front wall 4 is located in front of the partition wall 5. A cross-sectional shape of the front wall 4 is in the form of an arc formed convexly toward the front side. The tangent line L2 adjoining a central part in the height direction of the front wall 4 is parallel to the rear wall 1.

Although illustration is omitted, an upper end portion of the front wall 4 may be extended above an intersection of the front wall 4 with the upper wall 2, and a lower end portion of the front wall 4 may be extended below an intersection of the front wall 4 with the lower wall 3. That is, the upper end portion of the front wall 4 may be utilized as a flange which spreads above from the upper wall 2, and the lower end portion of the front wall 4 may be utilized as a flange which spreads below from the lower wall 3.

The partition wall 5 is located between the rear wall 1 and the front wall 4 and connects the upper wall intermediate part 2b with the lower wall intermediate part 3b. The tangent line L3 adjoining a central part in the height direction of the partition wall 5 is parallel to the rear wall 1.

The upper support wall 6 extends upward and forward at an angle from an upper half (a portion located on the upper side of the virtual plane L1) of the rear wall 1, and supports a central part in the height direction of an upper half (a portion located on the upper side of the virtual plane L1) of the partition wall 5.

The lower support wall 7 extends downward and forward at an angle from a lower half (a portion located on the lower side of the virtual plane L1) of the rear wall 1, and supports a central part in the height direction of a lower half (a portion located on the lower side of the virtual plane L1) of the partition wall 5.

The upper support wall 6 and the lower support wall 7 in the present embodiment have the shape of a flat plate, respectively, and face each other across the virtual plane L1. The upper support wall 6 and the lower support wall 7 are in a plane-symmetrical relationship with each other with the virtual plane L1 as a symmetry plane. A distance between the upper support wall 6 and the virtual plane l1 is equal to a distance between the lower support wall 7 and the virtual plane l1. A distance between the upper support wall 6 and the lower support wall 7 gradually increases toward the partition wall 5 from the rear wall 1.

An intersection P1 of the partition wall 5 with the upper support wall 6 is located above an intersection P3 of the partition wall 5 with the intermediate support wall 8. An intersection P2 of the partition wall 5 with the lower support wall 7 is located below the intersection P3 of the partition wall 5 with the intermediate support wall 8. A distance between the intersections P1 and P3 is equal to a distance between the intersections P2 and P3. A distance between the intersections P1 and P2 is equal to or more than one third and less than half of a distance between the upper wall intermediate part 2b and the lower wall intermediate part 3b (the maximum distance between the upper wall 2 and the lower wall 3).

The intermediate support wall 8 extends forward from the central part in the height direction of the partition wall 5, and supports the central part in the height direction of the front wall 4. The intermediate support wall 8 in the present embodiment has the shape of a flat plate along the horizontal plane.

Two spaces V1, V2 in the up-down direction are formed between the front wall 4 and the partition wall 5.

The space V1 on the upper side (hereinafter referred to as an "upper crushing space V1") is a space surrounded by the front half part of the upper wall 2, the upper half part of the front wall 4, the upper half part of the partition wall 5 and the intermediate support wall 8. The space V2 on the lower side (hereinafter referred to as a "lower crushing space V2") is a space surrounded by the front half part of the lower wall 3, the lower half part of the front wall 4, the lower half part of the partition wall 5 and the intermediate support wall 8. That is, the space surrounded by the upper wall 2, the lower wall 3, the front wall 4 and the partition wall 5 is divided by the intermediate support wall 8 into the upper crushing space V1 and the lower crushing space V2.

Each of the upper crushing space V1 and the lower crushing space V2 is a vertically long space (namely, a space having a great difference between its height dimension and its side dimension). The maximum height dimension $h_1$ of the upper crushing space V1 (the maximum distance between the upper wall 2 and the intermediate support wall 8) is equal to or more than twice as large as the length dimension $b_1$ of the intermediate support wall 8 (the maximum width dimension of the upper crushing space V1). Likewise, the maximum height dimension of the lower crushing space V2 (the maximum distance between the lower wall 3 and the intermediate support wall 8) is equal to or more than twice as large as the length dimension $b_1$ of the intermediate support wall 8. Note that cross-sectional shapes of the upper crushing space V1 and the lower crushing space V2 are in a plane-symmetrical relationship with each other with the virtual plane L1 as a symmetry plane.

Three spaces V3, V4 and V5 lining up in the up-down direction are formed between the rear wall 1 and the partition wall 5.

The uppermost space V3 (hereinafter referred to as an "upper support space V3") is a space surrounded by the upper part of the rear wall 1, the rear half part of the upper wall 2, the upper part of the partition wall 5 and the upper support wall 6. The lowermost space V4 (hereinafter referred to as a "lower support space V4") is a space surrounded by the lower part of the rear wall 1, the rear half part of the lower wall 3, the lower part of the partition wall 5 and the lower support wall 7. The central space V5 (hereinafter referred to as a "central support space V5") is a space surrounded by the central part of the rear wall 1, the central part of the partition wall 5, the upper support wall 6 and the lower support wall 7. That is, the space surrounded by the rear wall 1, the upper wall 2, the lower wall 3 and the partition wall 5 is divided by the upper support wall 6 and the lower support wall 7 into the upper support space V3, the lower support space V4 and the central support space V5.

Each of the upper support space V3 and the lower support space V4 is a space having a small difference between vertical and horizontal dimensions (namely, a space having a small difference between its height dimension and its side dimension). The maximum height dimension $h_3$ of the upper support space V3 (the maximum distance between the upper wall 2 and the upper support wall 6) is equal to or less than one and two tenths times as large as the maximum width dimension $b_3$ of the upper support space V3. A cross-sectional area of the upper support space V3 is one half to two thirds as large as a cross-sectional area of the upper crushing space V1. Likewise, the maximum height dimension of the lower support space V4 is equal to or less than one and two tenths times as large as the maximum width dimension of the lower support space V4. A cross-sectional area of the lower support space V4 is one half to two thirds as large as a cross-sectional area of the lower crushing space V2. Cross-sectional shapes of the upper support space V3 and the lower support space V4 are in a plane-symmetrical relationship with each other with the virtual plane L1 as a symmetry plane.

The central support space V5 is a space having a nearly trapezoidal cross-sectional shape. A cross-sectional area of the central support space V5 is larger than a cross-sectional area of the upper support space V3 (or the lower support space V4).

Next, an absorption process of collision energy at a time of front collision (at a time of collision with a flat barrier FB) will be described with reference to FIGS. 4A to 4F and FIG. 5. FIG. 5 is a graph showing in its horizontal axis the amount of forward movement of the vehicle body from the time of contact with the flat barrier FB, and showing in its vertical axis a collision reaction force. Note that, as shown in FIG. 6D, a bumper reinforcement R' according to a comparative example includes the same outer shell as in the bumper reinforcement R, and one support wall which partitions the internal space of the outer shell into upper and lower spaces.

Figure 4A:
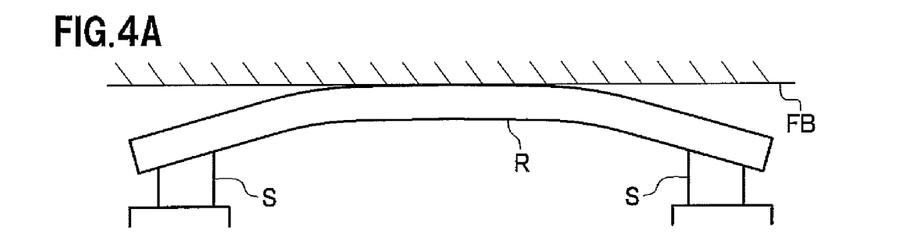
FIG. 4A is a plan view showing a state in an initial term of a beam bending process.
Figure 4B:
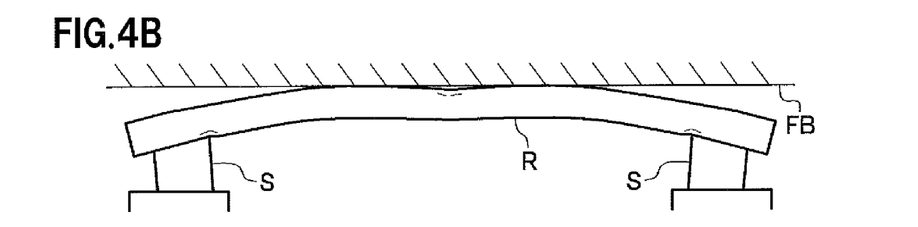
FIG. 4B is a plan view showing a state in a middle term of the beam bending process.
Figure 4C:
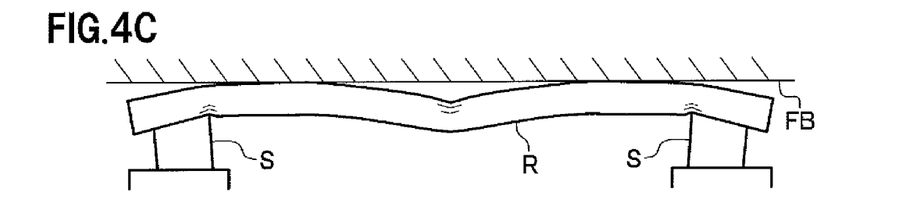
FIG. 4C is a plan view showing a state in a final term of the beam bending process and in an initial term of a beam crushing process.
Figure 5:
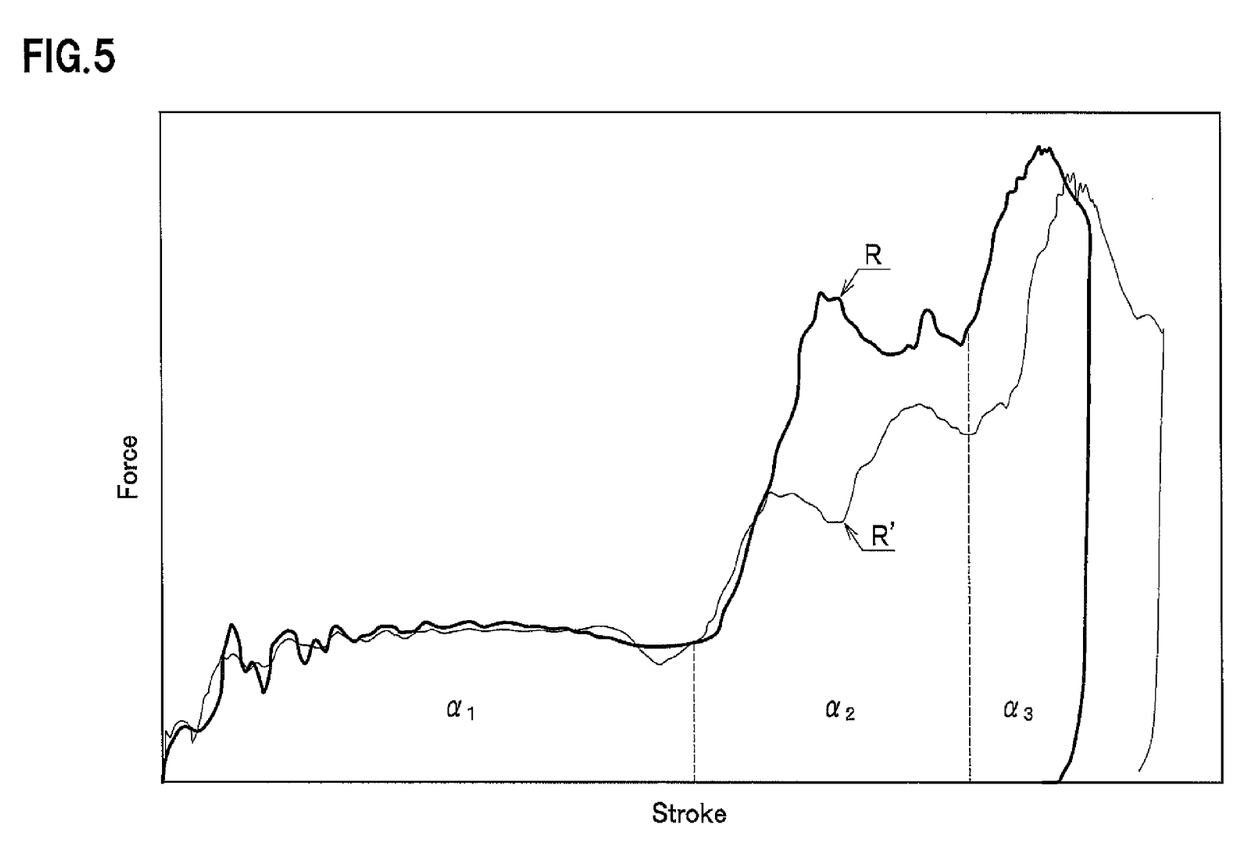
FIG. 5 is a diagram showing curves indicative of a relationship between a collision reaction force and a displacement (stroke) at the time of collision with the flat barrier.

As shown in FIG. 4A, at an early stage of the collision, the flat barrier FB collides with a central part in the span of the bumper reinforcement R. Then, as shown in FIGS. 4B and 4C, deformation in which the curved portions of the bumper reinforcement R are bent to the vehicle body side (beam bending process) progresses to allow collision energy to be absorbed. The amount of absorption of the collision energy, which is absorbed from the start of collision until the bumper reinforcement R is brought into the state of FIG. 4C, corresponds to an area $\alpha_1$ shown in FIG. 5 (value of integral for the curve indicative of the relationship between the collision reaction force and the displacement (stroke)).

When the beam bending process progresses to some extent, as shown in FIGS. 4C to 4F, a beam crushing process in which the bumper stays S, S are allowed to sink into the bumper reinforcement R at the end portions of the bumper reinforcement R progresses. In the beam crushing process, the crushing spaces V1, V2 (see FIG. 3) and the support spaces V3, V4, V5 (see FIG. 3) crush at the end portions of the bumper reinforcement R to allow the collision energy to be absorbed. The amount of absorption of the collision energy, which is absorbed until the bumper reinforcement R is brought into the state of FIG. 4E from the state of FIG. 4C, corresponds to an area $\alpha_2$ shown in FIG. 5.

Figure 4D:
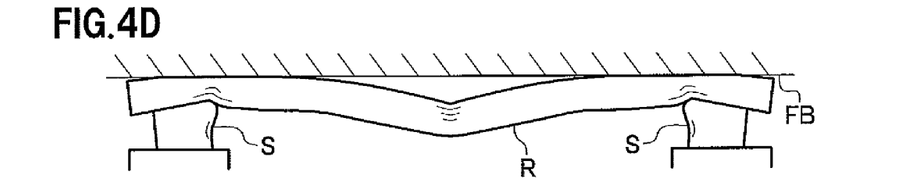
FIG. 4D is a plan view showing a state in a middle term of the beam crushing process and in an initial term of a stay crushing process.
Figure 4E:
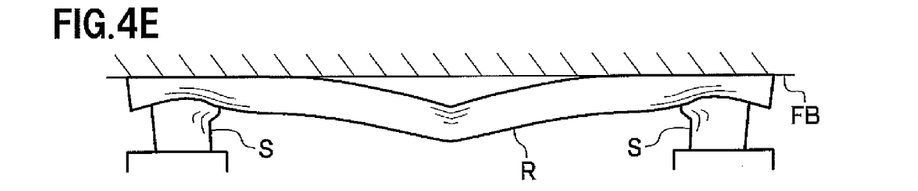
FIG. 4E is a plan view showing a state in the middle term of the beam crushing process and the stay crushing process.
Figure 4F:
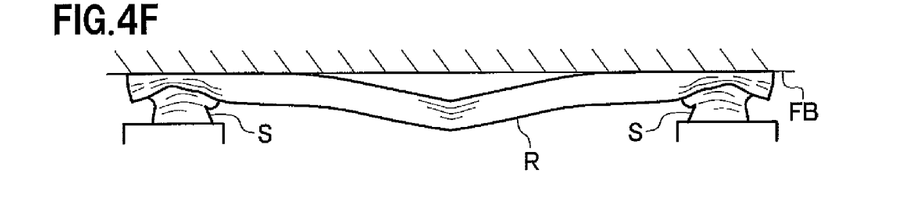
FIG. 4F is a plan view showing a state in a final term of the beam crushing process and the stay crushing process.

When the beam crushing process progresses to some extent, as shown in FIGS. 4D to 4F, a stay crushing process in which the bumper stays S, S crush progresses. The amount of absorption of the collision energy, which is absorbed until the bumper reinforcement R is brought into the state of FIG. 4F from the state of FIG. 4E, corresponds to an area $\alpha_3$ shown in FIG. 5.

Also with respect to the bumper reinforcement R' according to the comparative example, the beam bending process, the beam crushing process and the stay crushing process allow the collision energy to be absorbed. However, as shown in FIG. 5, the amount of absorption of the collision energy is small as compared to the case of the bumper reinforcement R. This is because two crushing spaces in the up-down direction of the bumper reinforcement R' are easy to get crushed and thus a greater collision reaction force cannot be obtained in the beam crushing process.

Next, an absorption process of collision energy at a time of up-down offset collision will be described with reference to FIGS. 6A to 6F and FIG. 7. Note that FIGS. 6D to 6F are views showing deformed states of the bumper reinforcement R' according to the comparative example. Moreover, FIG. 7 is a graph showing in its horizontal axis the amount of forward movement of the vehicle body from the time of contact with a collision partner, and showing in its vertical axis a collision reaction force. Signs of (a) to (f) marked along the horizontal axis in FIG. 7 correspond to the deformed states shown in FIGS. 6A to 6F.

Figure 6A:
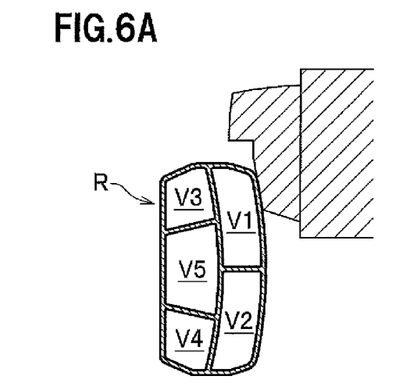
FIGS. 6A to 6C are end views in the center in a vehicle width direction of the bumper reinforcement according to the embodiment of the present invention.
Figure 6B:
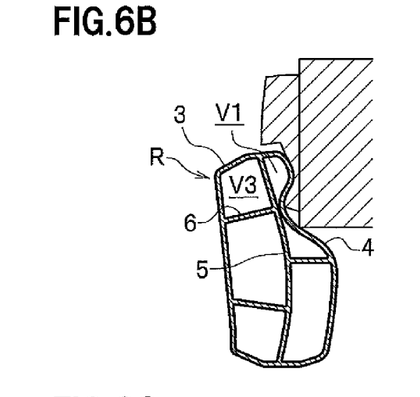

When a collision load acts on the upper part of the bumper reinforcement R due to up-down offset collision, as shown in FIGS. 6A and 6B, buckling and plastic deformation are generated in the upper half part of the front wall 4 and the front half part of the upper wall 2, to cause the upper crushing space V1 to crush to allow the collision energy to be absorbed. The upper support space V3 is hard to get crushed as compared to the upper crushing space V1 and accordingly maintains substantially the original shape even after the crushing of the upper crushing space V1 is substantially completed (see FIGS. 6B and 6C).

Figure 6C:
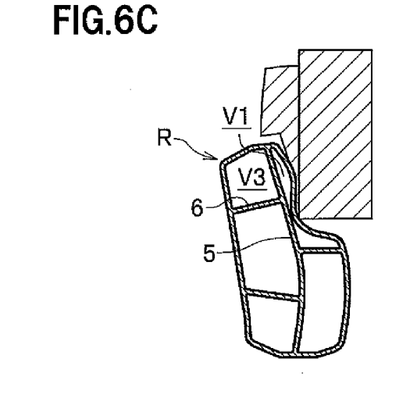
Figure 6D:
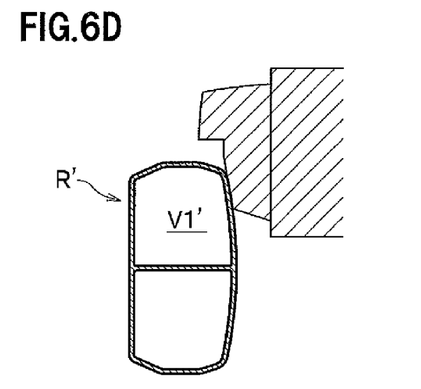
FIGS. 6D to 6F are end views in the center in a vehicle width direction of a bumper reinforcement according to a comparative example.
Figure 6E:
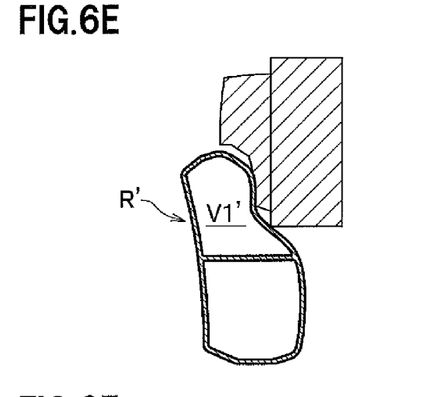
Figure 6F:
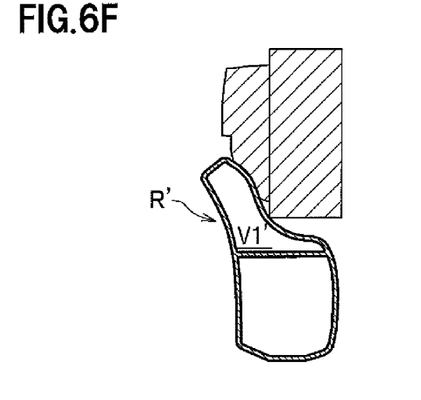
Figure 7:
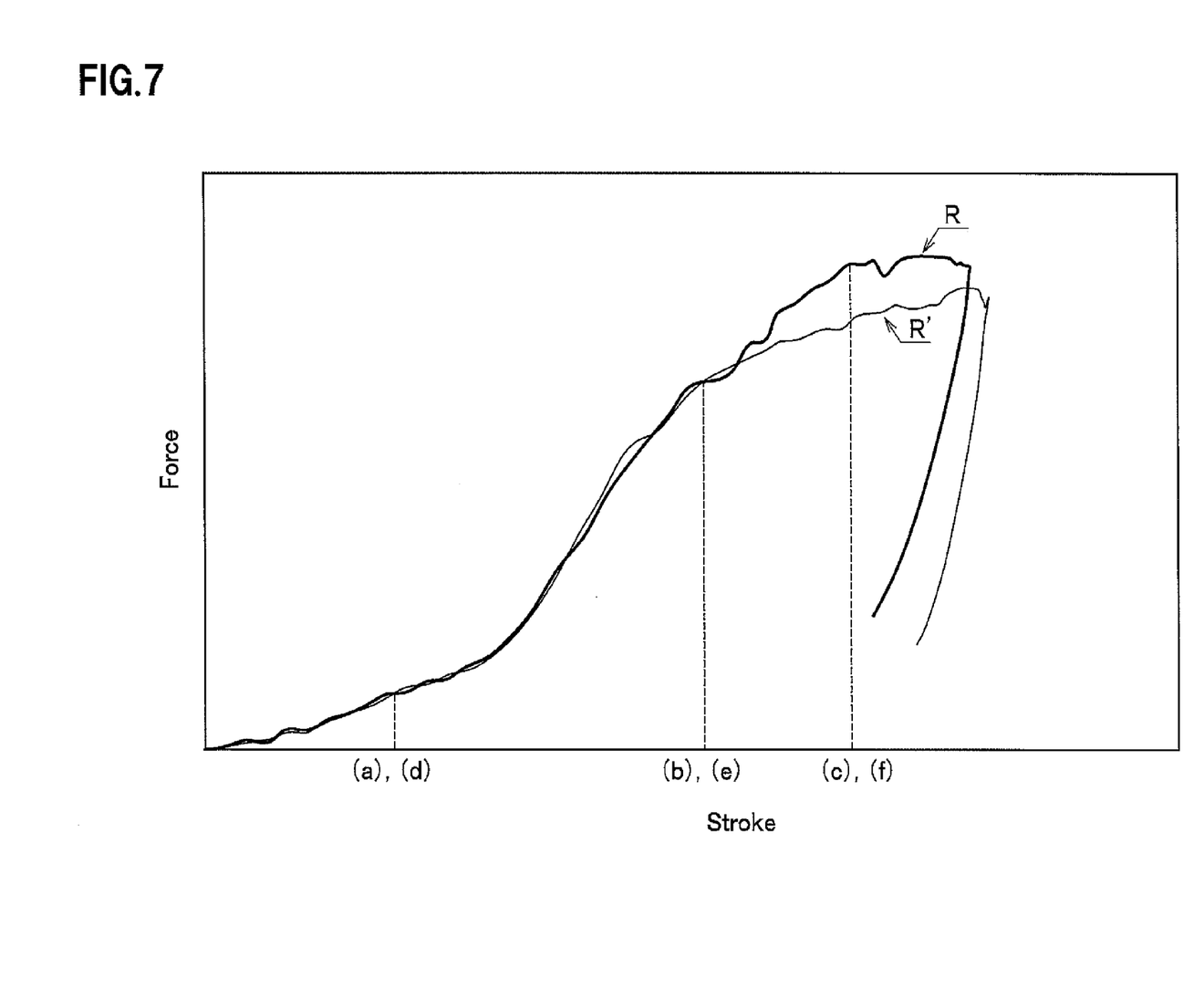
FIG. 7 is a diagram showing curves indicative of a relationship between a collision reaction force and a displacement (stroke) at the time of up-down offset collision.

After the upper crushing space V1 crushes, the collision load is received at the upper support wall 6 and, as a result, deformation in which the bumper reinforcement R is bent to the vehicle body side (beam bending process) progresses to allow the collision energy to be absorbed in the beam bending process. Moreover, even after the upper crushing space V1 crushes, the collision load can be received at the rear half part of the bumper reinforcement R (the portion located on the vehicle body side relative to the partition wall 5) to thereby reduce occurrence of a phenomenon in which the bumper reinforcement R gets into under a collision partner or a phenomenon in which the bumper reinforcement R gets up on the collision partner.

On the other hand, where a collision load acts on the upper part of the bumper reinforcement R' according to the comparative example, as shown in FIGS. 6D to 6F, the upper crushing space V1' crushes to allow the collision energy to be absorbed. However, there is no "stay" existing after the upper crushing space V1' crushes (see FIG. 6F) and thus torsional stiffness of the bumper reinforcement R' is made insufficient. Consequently, a collision reaction force in the beam bending process does not become increased as compared to the case of the bumper reinforcement R, and thus the amount of absorption of the collision energy becomes decreased. Moreover, since the upper crushing space V1' crushes to make it impossible to receive the collision load, a phenomenon in which the bumper reinforcement R' gets into under a collision partner or a phenomenon in which the bumper reinforcement R' gets up on the collision partner is easy to occur.

As described above, in the bumper reinforcement R according to the present embodiment, the upper crushing space V1 and the lower crushing space V2 are formed on the front side of the partition wall 5. Consequently, where a position on which a collision load acts is offset to the upper side of the intermediate support wall 8, the upper crushing space V1 principally crushes at an early stage of the collision to allow collision energy to be absorbed, and where the position on which a collision load acts is offset to the lower side of the intermediate support wall 8, the lower crushing space V2 principally crushes at the early stage of the collision to allow collision energy to be absorbed.

Also, in the bumper reinforcement R, the upper half of the partition wall 5 (i.e., the portion of the partition wall 5 located on the upper side of the intermediate support wall 8) is supported by the upper support wall 6, and the lower half of the partition wall 5 (i.e., the portion of the partition wall 5 located on the lower side of the intermediate support wall 8) is supported by the lower support wall 7. Consequently, the spaces surrounded by the rear wall 1, the upper wall 2, the lower wall 3 and the partition wall 5 (the upper support space V3, the lower support space V4, and the central support space V5) are hard to get crushed as compared to the upper crushing space V1 and the lower crushing space V2. That is, the bumper reinforcement R makes it possible, even after the upper crushing space V1 or the lower crushing space V2 crushes due to the up-down offset collision, to receive a collision load at the rear half part of the bumper reinforcement R (the portion located on the vehicle body side relative to the partition wall 5), and accordingly, to reduce occurrence of a phenomenon in which the bumper reinforcement R gets into under a collision partner or a phenomenon in which the bumper reinforcement R gets up on the collision partner.

Moreover, in the bumper reinforcement R, the cross-sectional shape of the partition wall 5 is an arc shape formed convexly toward the front wall 4. This allows the partition wall 5 to be an arc and the intermediate support wall 8 to be supported at the top of the arch, thereby reducing deformation generated in the partition wall 5 as compared to a case where the partition wall 5 has the form of a flat plate.

Furthermore, in the bumper reinforcement R, the upper support wall 6 and the lower support wall 7 are allowed to face each other across the virtual plane L1, and the distance between the upper support wall 6 and the virtual plane L1 is equal to the distance between the lower support wall 7 and the virtual plane L1. This allows positional relationship of the upper support wall 6, the lower support wall 7 and the intermediate support wall 8 to be balanced. That is, the bumper reinforcement R makes it possible, even where the position on which a collision load acts is offset to any of the upper or lower direction, to make the amount of absorption of collision energy on the upper and lower sides to an equal degree.

REFERENCE SIGNS LIST

R Bumper reinforcement
1 Rear wall
2 Upper wall
3 Lower wall
4 Front wall
5 Partition wall
6 Upper support wall
7 Lower support wall
8 Intermediate support wall
L1 Virtual plane
P1, P2, P3 Intersection
S Bumper stay

The invention claimed is:
1. A bumper reinforcement composed of a hollow shape material, comprising:
  a rear wall which faces a vehicle body;
  an upper wall which extends forward from an upper part of the rear wall;
  a lower wall which extends forward from a lower part of the rear wall;
  a front wall which extends forward from the upper wall to the lower wall;
  a partition wall which is located between the rear wall and the front wall and which extends from the upper wall to the lower wall;
  an upper support wall and a lower support wall which are located between the upper wall and the lower wall and are spaced from the upper wall and the lower wall, respectively, and which extend from the rear wall to the partition wall; and
  an intermediate support wall which is located between the upper wall and the lower wall and which extends from the front wall to the partition wall, wherein
    an intersection of the partition wall with the upper support wall is located above an intersection of the partition wall with the intermediate support wall, and an intersection of the partition wall with the lower support wall is located below the intersection of the partition wall with the intermediate support wall.

2. The bumper reinforcement according to claim 1, wherein
a cross-sectional shape of the partition wall is an arc shape formed convexly toward the front wall.

3. The bumper reinforcement according to claim 1, wherein
the upper support wall and the lower support wall face each other across a virtual plane which passes through the intermediate support wall, and
a distance between the upper support wall and the virtual plane is equal to a distance between the lower support wall and the virtual plane.

4. The bumper reinforcement according to claim 2, wherein
the upper support wall and the lower support wall face each other across a virtual plane which passes through the intermediate support wall, and
a distance between the upper support wall and the virtual plane is equal to a distance between the lower support wall and the virtual plane.

5. The bumper reinforcement according to claim 1, wherein
a cross-sectional area of a space that is surrounded by the rear wall, the upper wall, the partition wall and the upper support wall, is one half to two thirds as large as a cross-sectional area of a space that is surrounded by the upper wall, the front wall, the partition wall and the intermediate support wall, and
a cross-sectional area of a space that is surrounded by the rear wall, the lower wall, the partition wall and the lower support wall, is one half to two thirds as large as a cross-sectional area of a space that is surrounded by the lower wall, the front wall, the partition wall and the intermediate support wall.

6. The bumper reinforcement according to claim 2, wherein
a cross-sectional area of a space that is surrounded by the rear wall, the upper wall, the partition wall and the upper support wall, is one half to two thirds as large as a cross-sectional area of a space that is surrounded by the upper wall, the front wall, the partition wall and the intermediate support wall, and
a cross-sectional area of a space that is surrounded by the rear wall, the lower wall, the partition wall and the lower support wall, is one half to two thirds as large as a cross-sectional area of a space that is surrounded by the lower wall, the front wall, the partition wall and the intermediate support wall.

* * * * *